(12) United States Patent
Bennett (10) Patent No.: US 6,991,101 B2
(45) Date of Patent: Jan. 31, 2006

(54) DEVICE FOR LABELING AND STORING COMPUTER DISCS

(76) Inventor: David W. Bennett, 12051 Lomica Dr., San Diego, CA (US) 92128

(*) Notice: Subject to any disclaimer, the term of this patent is extended or adjusted under 35 U.S.C. 154(b) by 0 days.

(21) Appl. No.: 10/419,670

(22) Filed: Apr. 21, 2003

(65) Prior Publication Data

US 2004/0206655 A1 Oct. 21, 2004

(51) Int. Cl.
*B65D 85/57* (2006.01)
*A47G 29/00* (2006.01)

(52) U.S. Cl. ............... 206/308.1; 206/232; 206/459.5; 211/40; 211/41.12

(58) Field of Classification Search ............ 206/308.1, 206/459.5, 509, 232; 211/40, 41.12; 312/111; 229/75
See application file for complete search history.

(56) References Cited

U.S. PATENT DOCUMENTS

| | | | | |
|---|---|---|---|---|
| 3,401,993 A | * | 9/1968 | Fenkel | 312/111 |
| 5,209,353 A | * | 5/1993 | Lehtovaara | 206/312 |
| 5,715,935 A | * | 2/1998 | Seki | 206/232 |
| 5,722,538 A | * | 3/1998 | Neely et al. | 206/308.1 |
| 5,724,757 A | * | 3/1998 | Warden | 206/308.1 |
| 5,909,805 A | * | 6/1999 | Neely | 206/308.1 |
| 6,112,910 A | * | 9/2000 | Baxter | 211/40 |
| 6,220,504 B1 | * | 4/2001 | Flynn et al. | 229/71 |
| 6,220,505 B1 | * | 4/2001 | Flynn et al. | 229/75 |
| 6,481,572 B2 | * | 11/2002 | Wien et al. | 206/232 |

* cited by examiner

*Primary Examiner*—Bryon P. Gehman
(74) *Attorney, Agent, or Firm*—John R. Ross; John R. Ross, III (57) ABSTRACT

A kit for storing computer discs. The kit includes sheets of die-stamped card stock each of which are folded to form a CD or a DVD holder. The kit also includes a special stackable and expandable disc storage unit. Preferably, the user's computer prints labels on the holder identifying the contents of the CD or DVD. The software programming the computer utilizes may be provided on a CD or it can be downloaded from a WEB site. The disc storage unit is made up of a number of disc storage shelves of an elongated male tab and an elongated female receptor wherein the tabs and the receptor mate respectively with receptors and tabs on adjacent shelves to form the stackable and expandable storage unit. Preferably, the kit also includes end support pieces for preventing the disc storage shelves from sliding relative to each other while stacked. The compact disc holder is inserted into a stackable disc storage unit for storage and display.

15 Claims, 11 Drawing Sheets

PICTURES OF SUMMER
VACATION 2003

| File Name | Date Created | File Size | File Type |
|---|---|---|---|
| Karen and Bill at Beach | July 10, 2003 | 623 KB | JPEG |
| Bobby Surfing | July 10, 2003 | 821 KB | JPEG |
| Aunt Kassie and Uncle Rex | July 11, 2003 | 811 KB | JPEG |
| Billy and the Kids | July 11, 2003 | 738 KB | JPEG |
| Trip to . . . | . . . | . . . | . . . |
| . . . | . . . | . . . | . . . |
| . . . | . . . | . . . | . . . |
| . . . | . . . | . . . | . . . |
| Cousin Cindy at Beach | July 18, 2003 | 837 KB | JPEG |

Total Folder Size: 73 MB

Pictures of Summer Vacation 2003

Pictures of Summer Vacation 2003

31 — Edit Tab Design
32 — Edit Cover Design
33 — Edit Disc Contents Listing
30 — Save Cover Design
34 — Print

DEVICE FOR LABELING AND STORING COMPUTER DISCS

The present invention relates to computer discs, and, in particular, to devices and methods for the storage of computer discs.

BACKGROUND OF THE INVENTION

Compact Disc

A compact disc (CD) is an optical storage medium for digital data. The CD is a nonmagnetic, polished metal disc with a protective plastic coating that can hold up to approximately 783 megabytes (MB) of digital data. For example, a 783 MB CD can store up to approximately 74 minutes of high fidelity recorded sound. The CD is read by an optical scanning mechanism that uses a high-intensity light source, such as a laser, and mirrors.

Digital Versatile Disc (DVD)

A digital versatile disc (DVD), also sometimes referred to as a Digital Video Disc, is a high-capacity optical disc that is similar to a CD, but can store more data. DVDs are usually used for full-length movies and other very large data storage requirements. The amount of data storage capacity of a DVD depends on the number of sides and layers it has. Table 1 summarizes the approximate storage capacity of various DVD formats.

TABLE 1

| Format | Capacity in Gigabytes (GB) | Approx. Movie Time |
| --- | --- | --- |
| Single-sided/single-layer | 4.38 GB | 2 hours |
| Single-sided/double-layer | 7.95 GB | 4 hours |
| Double-sided/single-layer | 8.75 GB | 4.5 hours |
| Double-sided/double-layer | 15.9 GB | Over 8 hours |

ZIP and JAZZ Discs

Prior to CD/DVD storage discs, it was common to utilize either a ZIP or JAZZ disc for backup data storage. Indeed, some PC users still use either a ZIP or JAZZ disc.

However, they store less data, are bulky and are much more expensive than either a CD or a DVD disc.

Card Stock

Card stock, also called cover stock, is a stiff paper often used for postcards, catalog covers, and other items that require rigidity. Card stock is usually sold by the weight. For example 500 20"×26" sheets usually weigh within the range of 65 lb. to 100 lb.

The Need for Convenient Storage for Computer Discs

Personal computers are widely used in the United States and in other countries. Typical personal computers come equipped with built in data storage. Some users use their computers primarily for word processing and some Internet communication and do not need additional storage capacity. However many users need additional storage capacity. Some users create complex Computer Aided Design (CAD) files that require a large amount of storage space. Other users make their own digital recordings using the computer. A recent fast growing use of the computer is to organize and print personal digital photographs.

A typical computer user will create many files. Most users will save their files to the hard drive that stays attached to the computer. In recent years, the size of the hard drive has increased drastically. Modern high quality personal computers typically will come with at least an 80 GB hard drive. While 80 GB is adequate storage for most applications, a computer user will usually want to back up his files to some other storage medium. The user may want to back up his files because it is possible that his hard drive will crash. Or, it is possible that his computer could be stolen and all his data lost. Or, the user may want to back up his files because he wants to access them at another location. For example, if the user has created a music file, he may want to listen to the music on his home stereo CD player. Or, if the user has created digital photographs, he may want to save them to a DVD and display the photographs on his home television set.

Regardless of the reason for backing up the data, today's removable computer discs (CDs and DVDs) provide large storage capability. Transferring data from a computer hard drive to a CD or a DVD is a simple process easily mastered by even the most casual computer user. However, as the computer user creates more CDs or DVDs containing saved files, organizing them can be difficult. The CD or DVD computer disc can easily be misplaced, lost or damaged by the user.

What is needed is a better way to organize computer discs containing saved files.

SUMMARY OF THE INVENTION

The present invention provides a kit for storing computer discs. The kit includes sheets of die-stamped card stock each of which are folded to form a CD or a DVD holder. The kit also includes a special stackable and expandable disc storage unit. Preferably, the user's computer prints labels on the holder identifying the contents of the CD or DVD. The software programming the computer utilizes may be provided on a CD or it can be downloaded from a WEB site. The disc storage unit is made up of a number of disc storage shelves of an elongated male tab and an elongated female receptor wherein the tabs and the receptor mate respectively with receptors and tabs on adjacent shelves to form the stackable and expandable storage unit. Preferably, the kit also includes end support pieces for preventing the disc storage shelves from sliding relative to each other while stacked. The compact disc holder is inserted into a stackable disc storage unit for storage and display.

DETAILED DESCRIPTION OF THE PREFERRED EMBODIMENTS

Figure 31:
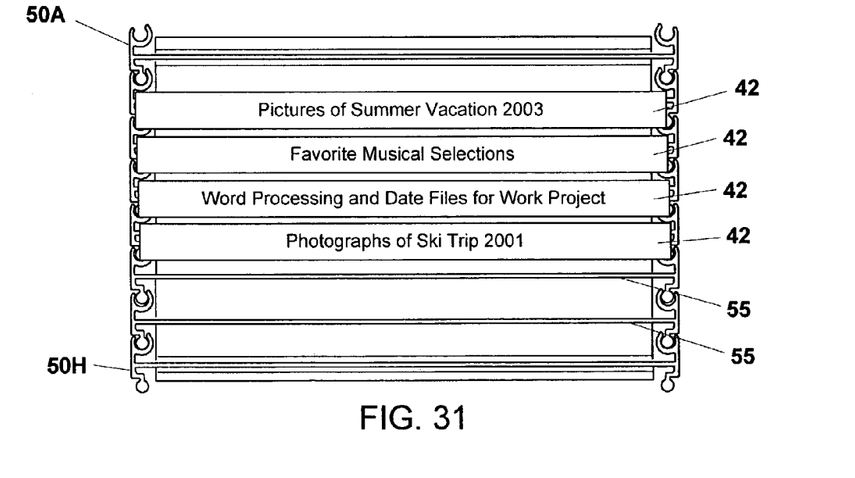

Preferred embodiments of the present invention can be seen by reference to FIGS. 1–31. The present invention allows a user to create his own customized computer disc holder for computer discs, such as a CD or a DVD. The user is then able to insert his computer disc into his custom designed computer disc holder. For example, FIG. 28 shows CD 70 inserted inside computer disc holder 42. The computer disc holder can then be inserted into a disc storage unit for safe storage, convenient display, and easy retrieval. For example, FIG. 31 shows a front view of a plurality of computer disc holders 42 inserted inside stacked disc storage shelves 50A–50H.

Kit Embodiment

In a preferred embodiment, the present invention is sold as a kit. The user purchases a kit that contains the following items:
1) a compact disc containing programming instructions for designing a cover for a computer disc (see discussion below under heading "Preparing the Cover for the CD"),
2) twenty-five disc storage shelf extrusions (FIG. 18)
3) Five end pieces (FIGS. 24–26)
4) thirty 8½ in. by 11 in. sheets of die-stamped card stock 26 having pattern 24 (FIG. 11)

After purchase of the kit, the user creates his customized covers for his computer discs by following procedures discussed below.

Figure 11:
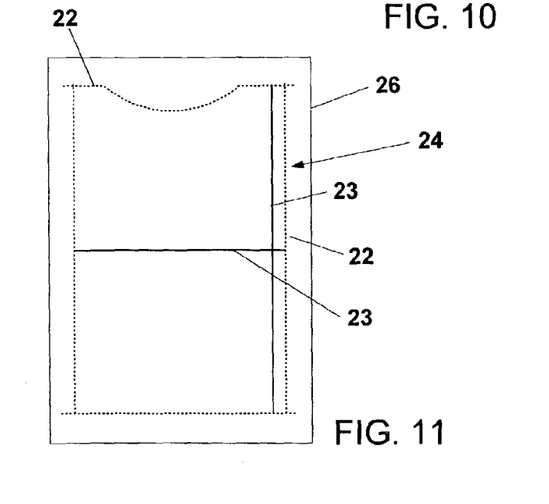

In another preferred embodiment, the kit contains only the following:
1) twenty-five disc storage shelves (FIG. 18)
2) Five end pieces (FIGS. 24–26)
3) thirty 8½ in. by 11 in. sheets of die-stamped card stock 26 having pattern 24 (FIG. 11)

In this preferred embodiment the user downloads the programming instructions over a computer network (such as the Internet).

Stackable Disc Storage Unit

Figures 18, 19:
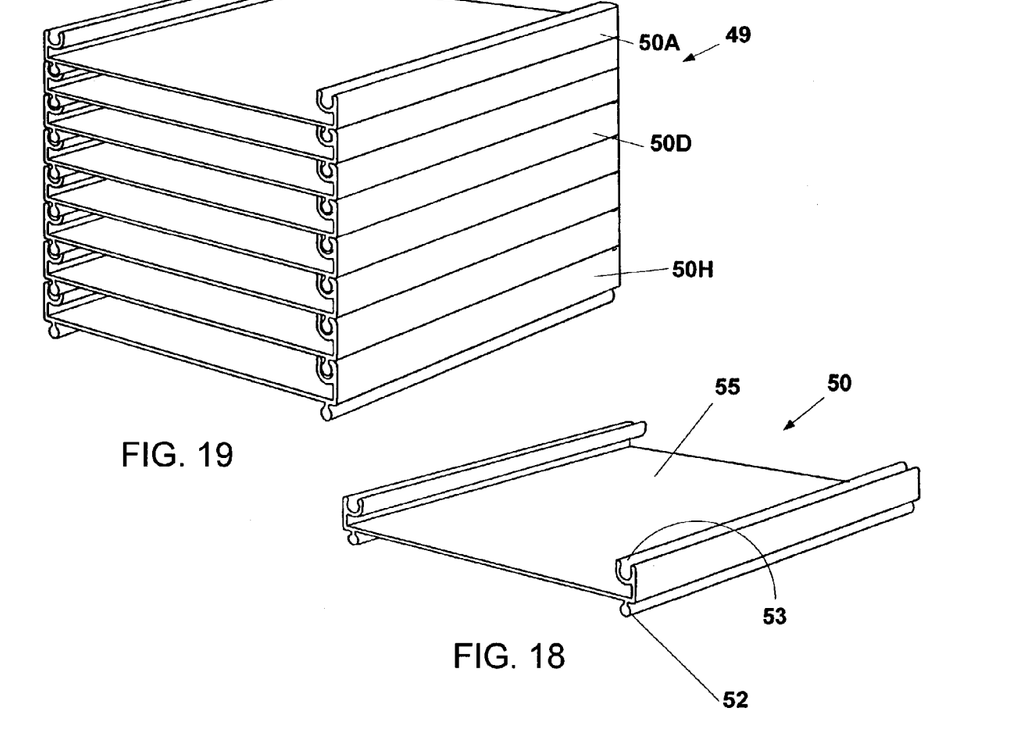
FIGS. 18–19 and FIGS. 22–23 show preferred stackable disc storage shelves.

FIG. 19 shows a perspective view of stackable disc storage unit 49 comprising eight stacked stackable disc storage shelves 50A–50H. Preferably, stackable disc storage shelf 50 (FIG. 18) is fabricated from extruded polyvinyl chloride (PVC). In the preferred embodiment, each disc storage shelf has a disc support platform 55, male extension 52 and female receptor 53. The storage disc units are stacked by interlocking male extension 52 with female receptor 53.

Stacking by Snapping

Figure 20A:
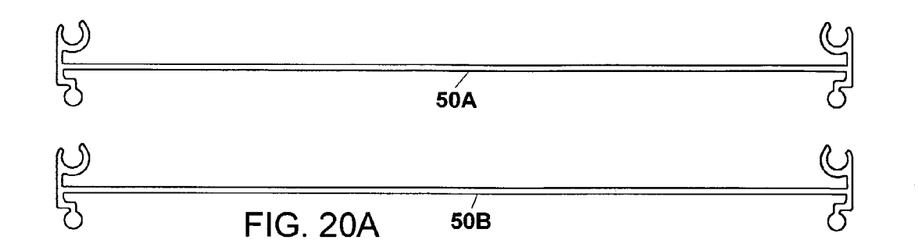
FIGS. 20A–20D show a preferred method for stacking the disc storage shelves.

In FIG. 20A, disc storage shelf 50A is positioned over a disc storage shelf 50B.

Figure 20B:
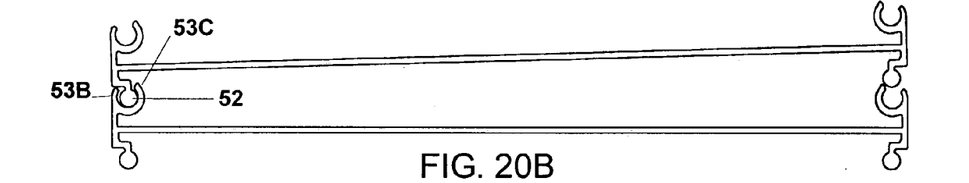

In FIG. 20B, the left male extension 52 of disc storage shelf 50A is snapped into the left female receptor 53 of disc storage shelf 50B. In order to prevent male extension 52 from slipping out of female receptor 53, the diameter of male extension 52 is greater than the opening between ends 53B and 53C of female receptor 53. Yet ends 53B and 53C are flexible enough so that male extension 52 can be snapped into female receptor 53 and pulled out of female receptor 53.

Figure 20C:
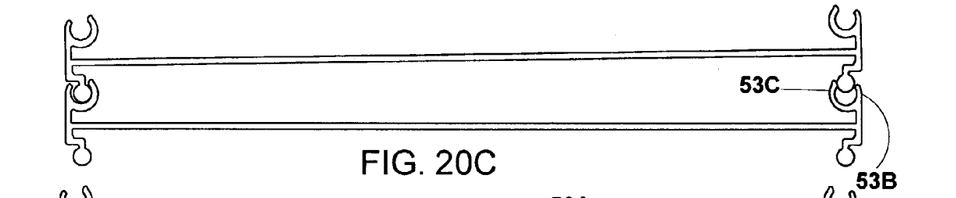

In FIG. 20C, the right male extension 53 of disc storage shelf 50A is being pushed into the top of the right female receptor 53 of disc storage shelf 50B. Ends 53B and 53C are flexing to allow the entry of male extension 53.

Figure 20D:
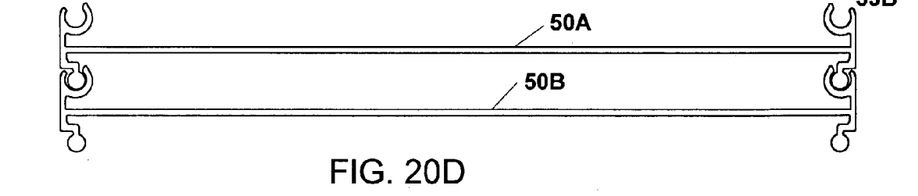

In FIG. 20D, disc storage shelf 50A has been snapped into disc storage shelf 50B.

The above sequence described in reference to FIGS. 20A–20D can be followed to stack as many or as few disc storage shelves as the user desires.

Stacking by Sliding

It is also possible to stack the disc storage shelves by sliding one on top of the other.

Figure 21A:
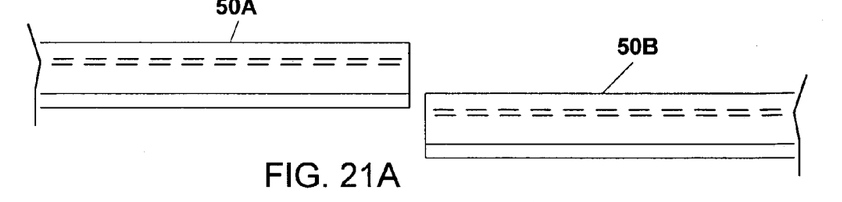
FIGS. 21A–21B show another preferred method for stacking the disc storage shelves.

In FIG. 21A, disc storage shelf 50A is positioned to the left of disc storage shelf 50B.

Figure 21B:
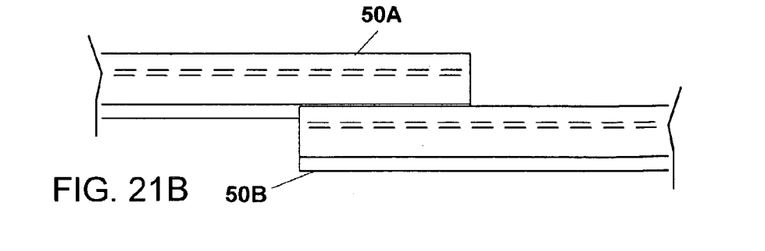

In FIG. 21B, disc storage shelf 50A is being slid onto the top of disc storage shelf 50B.

Figure 22:
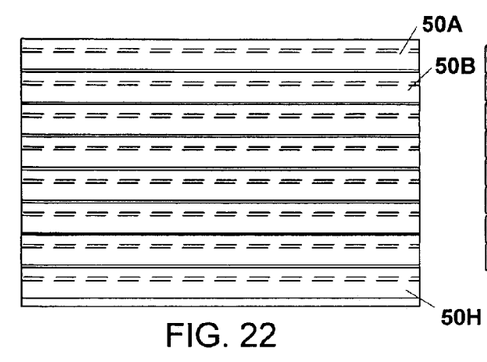
Figure 23:
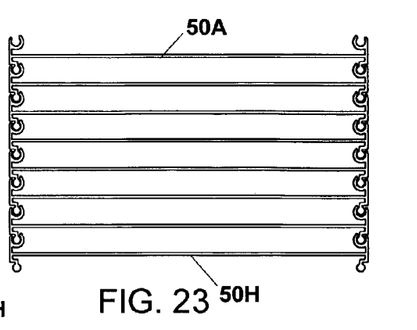

This process continues until the desired number of disc storage shelves is stacked. For example, FIG. 22 shows a side view of stacked disc storage shelves 50A–50H and FIG. 23 shows a front view of stacked disc storage shelves 50A–50H.

End Support Piece

Figure 24:
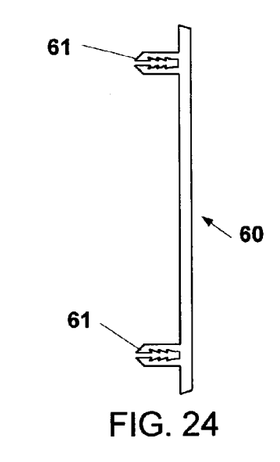
FIG. 24 shows a preferred end clip.
Figure 25:
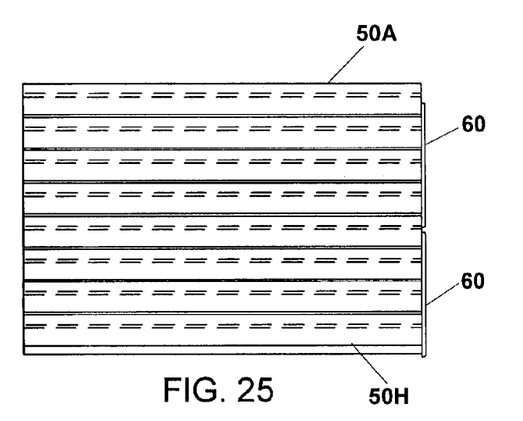
FIGS. 25–26 shows the preferred end clip of FIG. 25 attached to the disc storage shelves.
Figure 26:
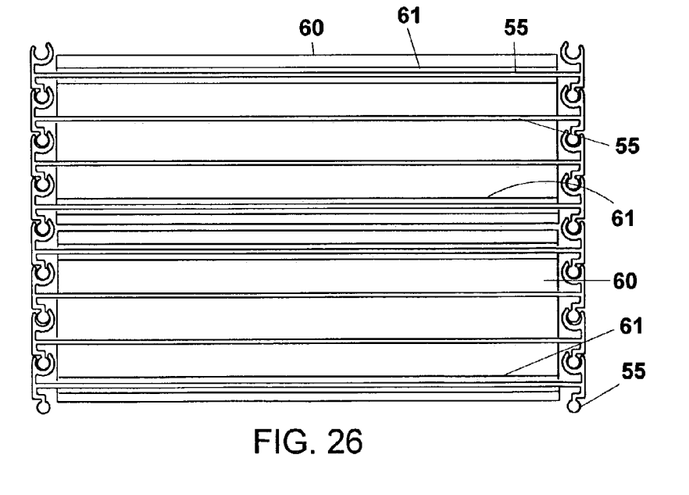

FIG. 24 shows a side view of end piece 60. End piece 60 has grips 61 for grasping disc support platform 55. FIG. 25 shows a side view and FIG. 26 shows a front view of end pieces 60 attached to the side of stacked disc storage shelves 50A–50H. Furthermore, FIG. 26 shows grips 61 grasping disc support platform 61. End pieces 60 function to prevent the disc storage shelves from sliding relative to each other while stacked.

Die-Stamped Card Stock

Creating Die-Stamped Card Stock

Figure 6:
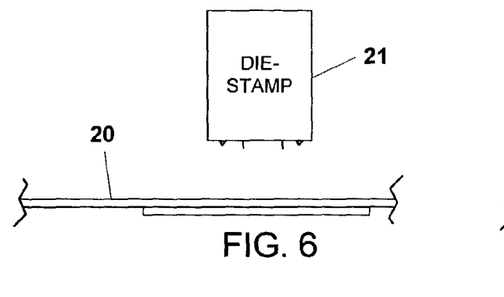
FIGS. 6–11 show card stock being die-stamped then cut.

In FIG. 6, a roll of 8½ inch wide 100 lb. card stock 20 is fed underneath die-stamp 21.

Figure 7:
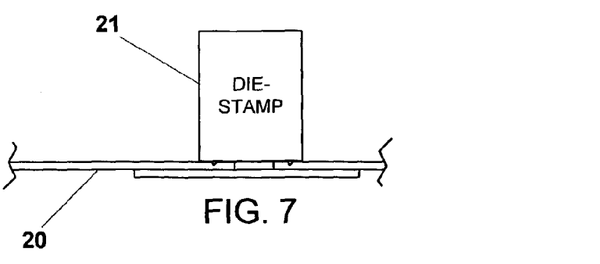

In FIG. 7, stamp 21 has been pressed onto the top of card stock 20, thereby imparting perforations 22 and creases 23 (see FIG. 8) into the card stock.

Figure 8:
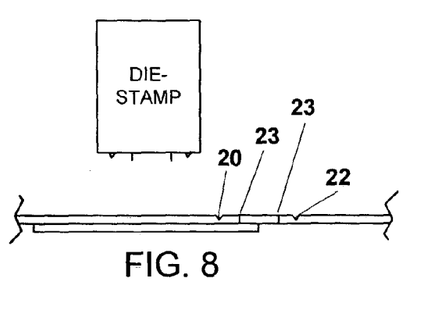

In FIG. 8, stamp 21 is raised and card stock 20 has been fed to the right.

Figure 9:
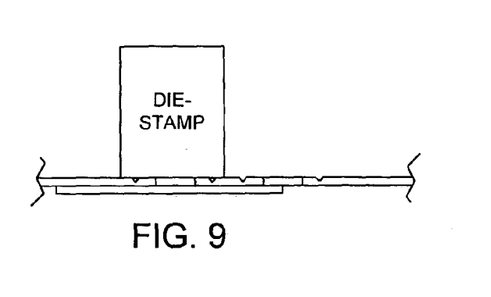

In FIG. 9, stamp 21 has been pressed onto the top of card stock roll 20, thereby imparting perforations 22 and bend creases 23 into a different section of the card stock. This process continues until the entire roll of card stock roll 20 has been die-stamped.

Figure 10:
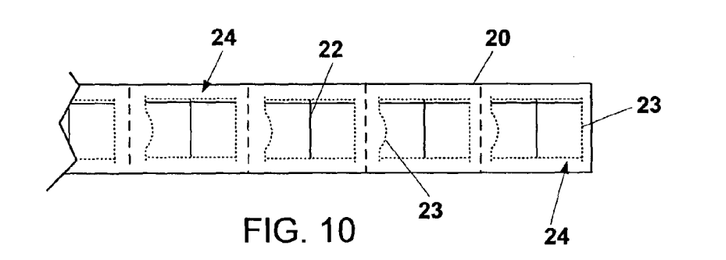

FIG. 10 shows a top view of card stock roll 20 after it has been die-stamped with patterns 24. Card stock roll 20 is then cut into 11 sections shown by dotted lines 25. A stack is thereby created of 8½ in.×11 in. die-stamped card stock, each having a pattern 24.

FIG. 11 shows a larger top view of a single sheet of 8½ in.×11 in. die-stamped card stock 26 having pattern 24. Pattern 24 includes perforations 22 and bend creases 23.

Example Illustrating How a Computer Disc Holder Design is Created

In one preferred embodiment illustrating the use of the present invention, a user takes a series of photographs with a digital camera. The user then downloads the images from his digital camera to his personal computer and stores them in a folder on his personal computer called "Pictures of Summer Vacation 2003". After inserting a recordable CD into his CD-ROM drive, the user then transfers the folder "Pictures of Summer Vacation 2003" and its contents to the CD.

Preparing the Cover for the CD

In the preferred embodiment, the user creates a design for the computer disc holder by utilizing a computer programmed to create the design. In the preferred embodiment, the user purchases software that contains the necessary programming instructions. For example, the user may purchase a CD that contains the programming instructions or he may download the programming instructions via a computer network.

Figures 1, 2, 3, 4:
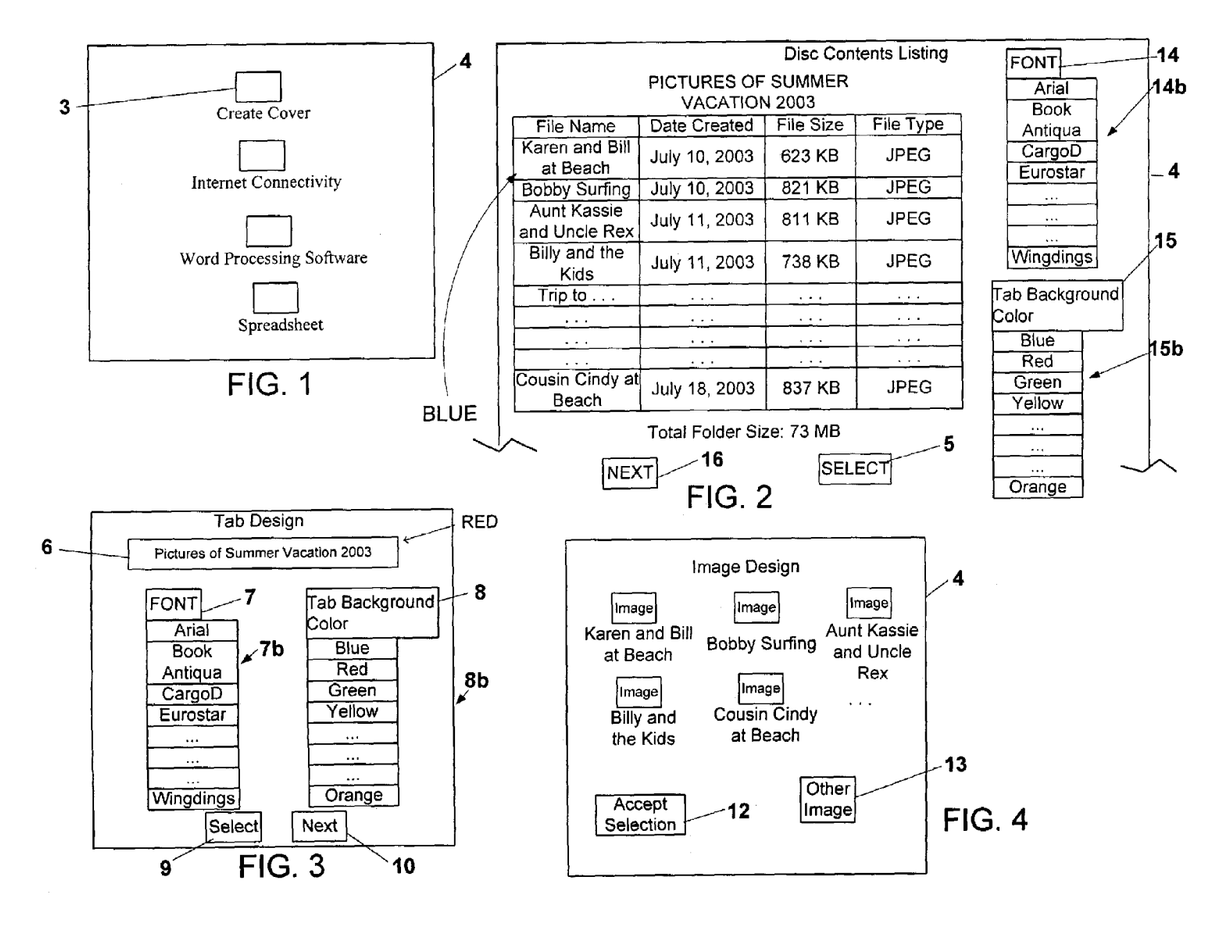
FIGS. 1–5 show the screen of a computer monitor.

After the user has successfully installed the program for creating a design for the computer disc holder, he can open the program by mouse clicking on the "Create Cover" icon 3 displayed on his computer screen monitor 4 shown in FIG. 1. After clicking on the "Create Cover" icon 3, the user's computer is programmed to read the contents of the CD that is stored in the user's CD drive and then display the contents in a format similar to that depicted in the "Disc Contents Listing" page shown in FIG. 2. The user can edit the font and tab background color by clicking on font button 14 and tab background color button 15. Clicking on font button 14 allows the user to access font menu 14b. Clicking on tab background color button 15 allows the user to access color menu 15b. In the preferred embodiment shown in FIG. 2, the user has selected Arial as the font and has selected a tab background color of blue. After the user is satisfied with the "Disc Contents Listing" page as displayed in FIG. 2, he can click on "Select" button 5.

The user then clicks on "Next" button 16 to go to the "Tab Design" page shown in FIG. 3. In the first preferred embodiment, tab display box 6 displays the folder title "Pictures of Summer Vacation 2003". The user can edit the font and tab background color by clicking on font button 7 and tab background color button 8. Clicking on font button 7 allows the user to access font menu 7b. Clicking on tab background color button 8 allows the user to access color menu 8b. In the preferred embodiment shown in FIG. 3, the user has selected CargoD as the font and has selected a tab background color of red. After the user is satisfied with the appearance of tab display box 6, he can click on "Select" button 9 to save his settings.

The user then clicks on "Next" button 10 to go to the "Image Design" page shown in FIG. 4. In the first preferred embodiment, the folder "Pictures of Summer Vacation 2003" contains digital images of the user's summer vacation. The preferred "Image Design" page shown in FIG. 4 allows the user to select one of the images in the folder "Pictures of Summer Vacation 2003" for the image choice by clicking on the desired image shown on monitor 4. In the example shown in FIG. 4, the user has clicked on image 11 of "Cousin Cindy at Beach" to select it. To accept the selection the user clicks on "Accept Selection" button 12.

Other Image Option

In the first preferred embodiment, the user also has the option of selecting an image other than an image stored in the folder "Pictures of Summer Vacation 2003". Specifically, the user can click on "Other Image" button 13 to select images stored elsewhere on the user's computer. For example, in the first preferred embodiment the software containing the programming instructions can be purchased with pre-designed images that are automatically installed onto the user's computer when the software is installed. The user can access these images by clicking on "Other Image" button 13. Also, by clicking on "Other Image" button 13, the user can access other images available to the user, such as other images stored on the user's computer or images that may be available via a computer network.

Reviewing the Cover

Figure 5:
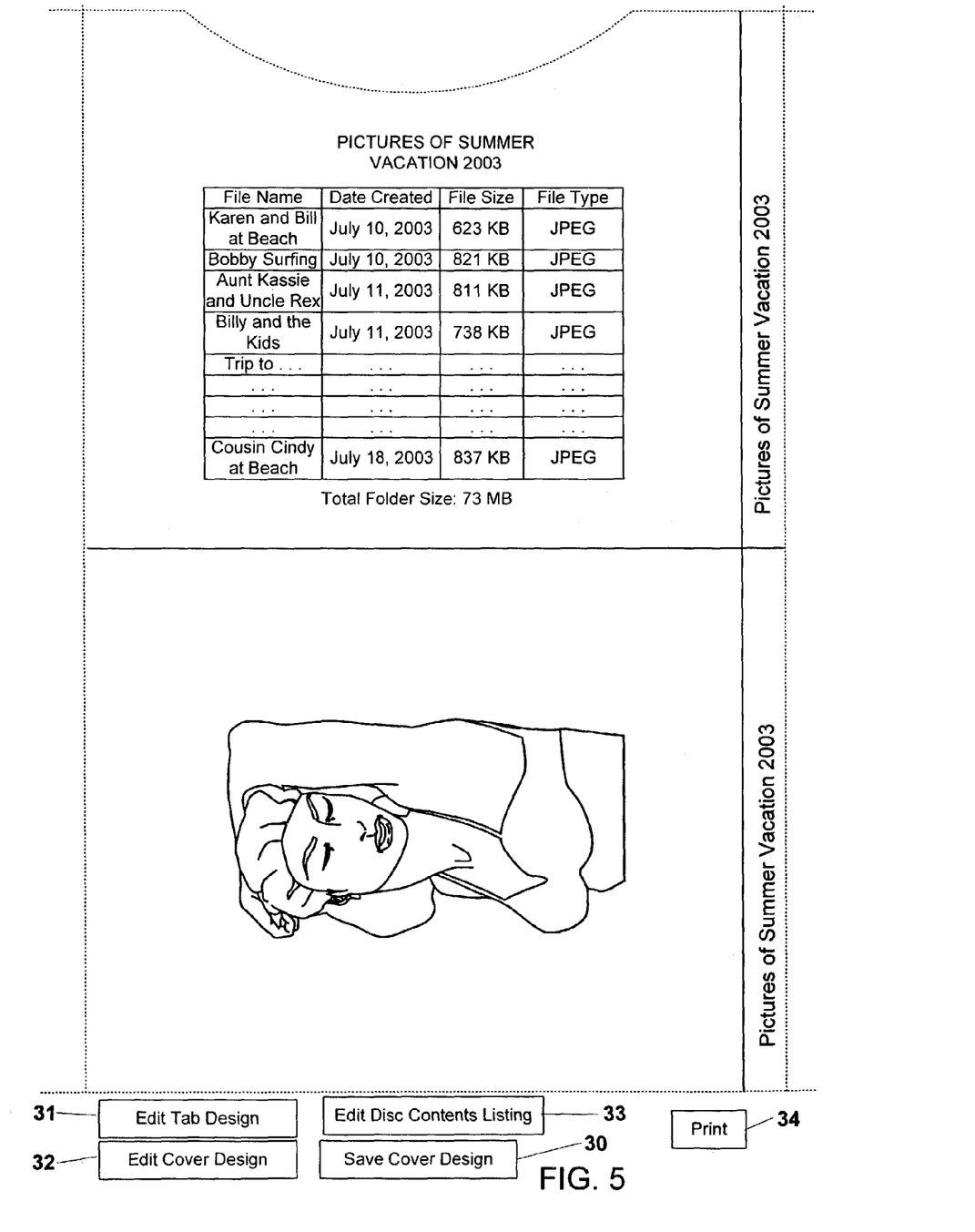

After the user has clicked on "Accept Selection" button 12, the user's computer displays a "Cover Review" page similar to that shown in FIG. 5. FIG. 5 shows what the disc holder will look like after it has been printed onto die-stamped card stock 26 having stamped pattern 24 (FIG. 11). If the user is satisfied with the image shown on the "Cover Review" page, he can click "Save Cover Design" button 30. Or, if the user wishes to change the appearance of the cover, he can click on "Edit Tab Design" button 31, "Edit Image Design" button 32, or "Edit Disc Contents Listing" button 33.

Printing the Cover

After the image has been edited to the satisfaction of the user and the user has clicked "Save Cover Design" button 30, the user can print the image onto die-stamped card stock 26 by inserting die-stamped card stock 26 into the user's printer and clicking on "Print" button 34.

Assembling the Cover

Figure 12:
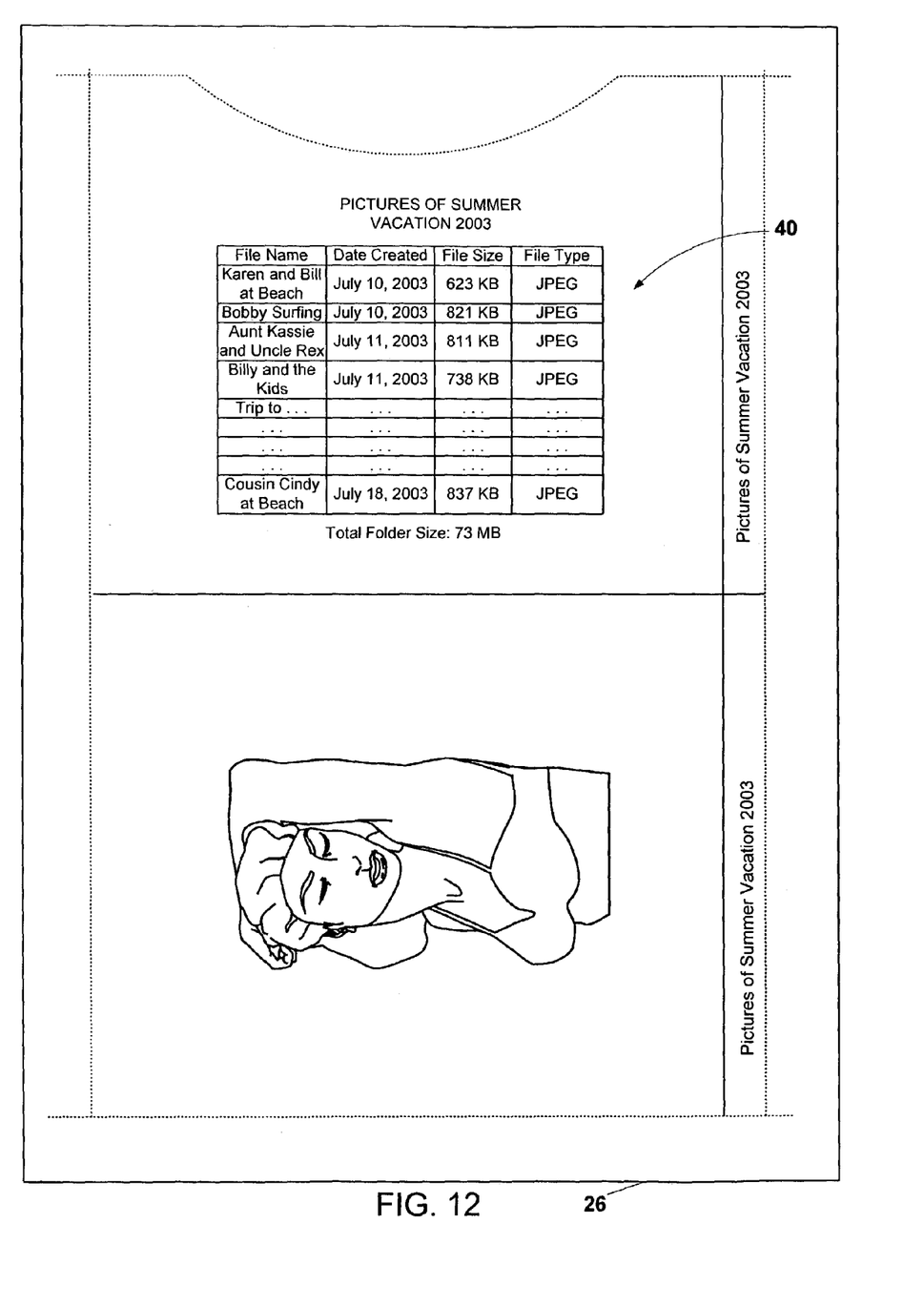
FIGS. 12–13 show a sheet of die-stamped card stock with a preferred cover design.
Figures 13, 14, 15, 16:
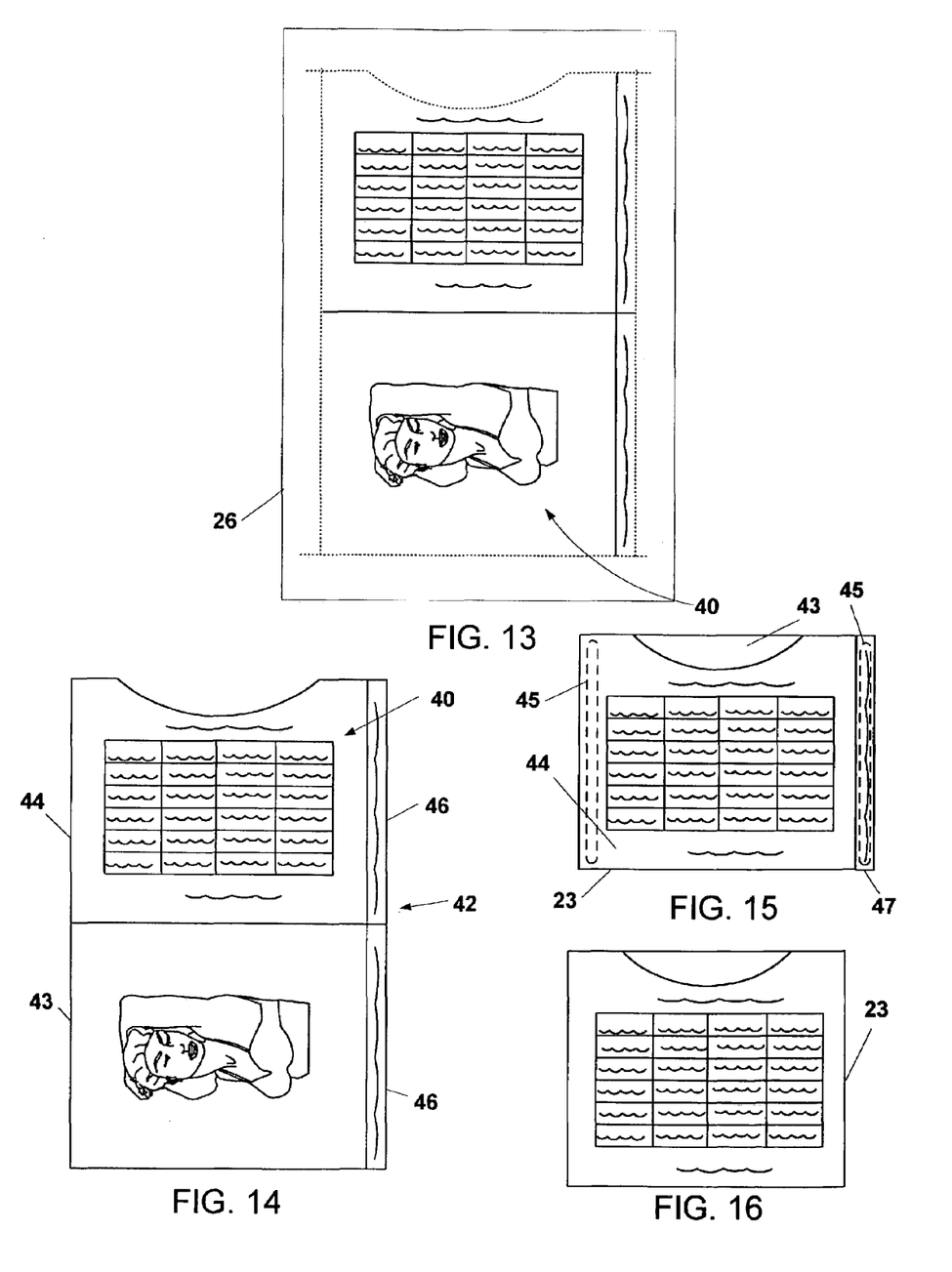
FIGS. 14–17 show the process of manipulating the die-stamped card stock into a computer disc holder.

FIG. 12 shows a large top view of cover design 40 printed onto the top of die-stamped card stock 26 and FIG. 13 shows a smaller top view of cover design 40 printed onto the top of die-stamped card stock 26.

In FIG. 14, computer disc holder 42 having cover design 40 has been punched out of die-stamped card stock 26.

In FIG. 15, the user has folded lower portion 43 along bend crease 23. The user has also applied adhesive 45 (shown in dotted line) between upper portion 44 and lower portion 43. The user has also applied adhesive between tab portions 46 (FIG. 14) to form tab 47.

Figure 17:
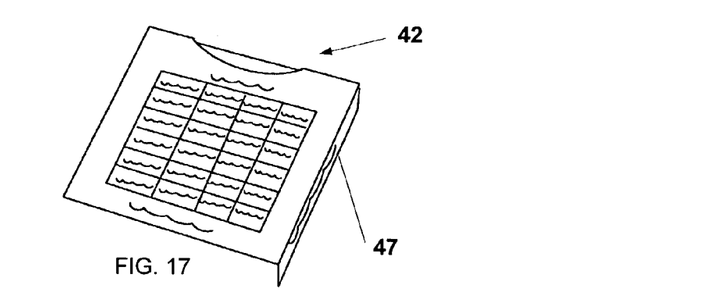

In FIG. 16, the user has bent tab 47 (FIG. 15) downward along second bend crease 23. FIG. 17 shows a perspective view of computer disc holder 42 with bent tab 47.

Inserting Computer Disc into Computer Disc Holder

Figure 27:
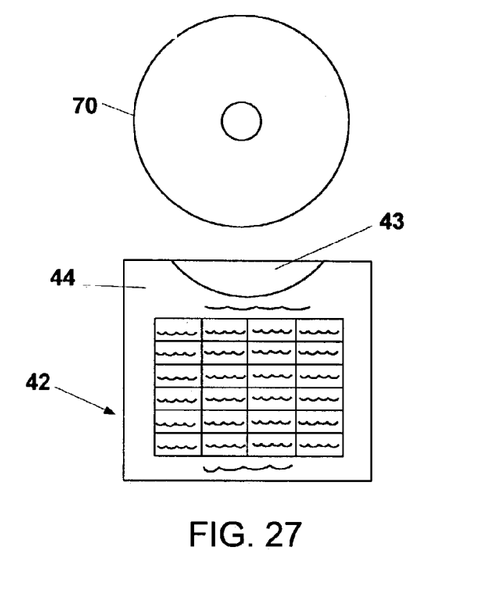
FIGS. 27–28 show a CD being inserted into a computer disc holder.
Figure 28:
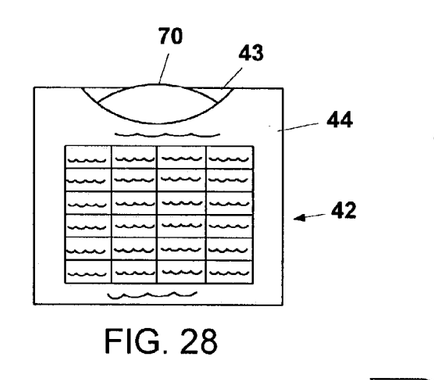

FIG. 27 shows CD 70 positioned over computer disc holder 42. CD 70 is inserted into computer disc holder 42 by slipping CD 70 into the pocket created between upper portion 44 and lower portion 43, as shown in FIG. 28.

Inserting Computer Disc Holder into Stack of Disc Storage Shelves 5

Figure 29:
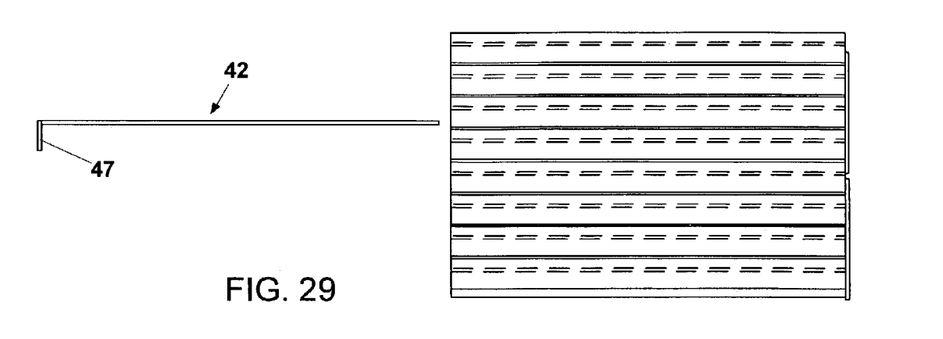
FIGS. 29–31 show a compact disc holder being inserted into the disc storage shelves.
Figure 30:
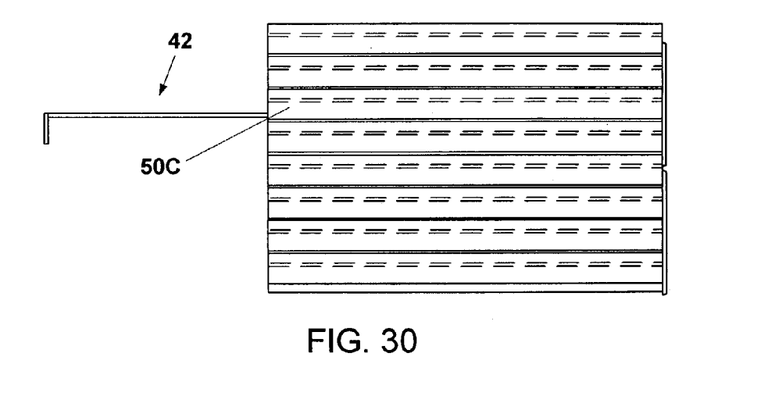

FIG. 29 shows computer disc holder 42 containing CD 70 (FIG. 28) being slid into disc storage shelf 50C. FIG. 31 shows multiple computer disc holders 42 inserted inside eight stacked disc storage shelves 50A–50H. Each computer disc holder rests on its own disc support platform 55.

Figure 32:
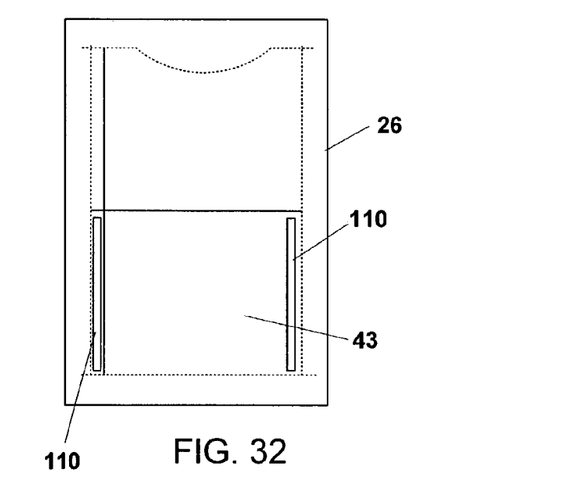
FIG. 32 shows a preferred sheet of die-stamped card stock.
Figure 33:
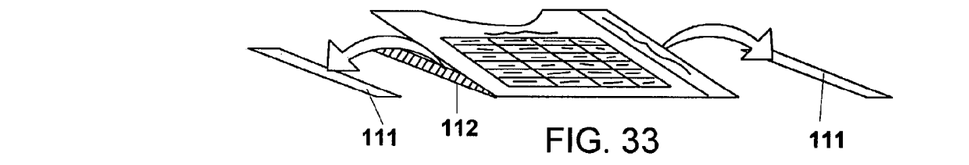
FIG. 33 shows the usage of adhesive bonding strips.
Figures 34, 35, 36:
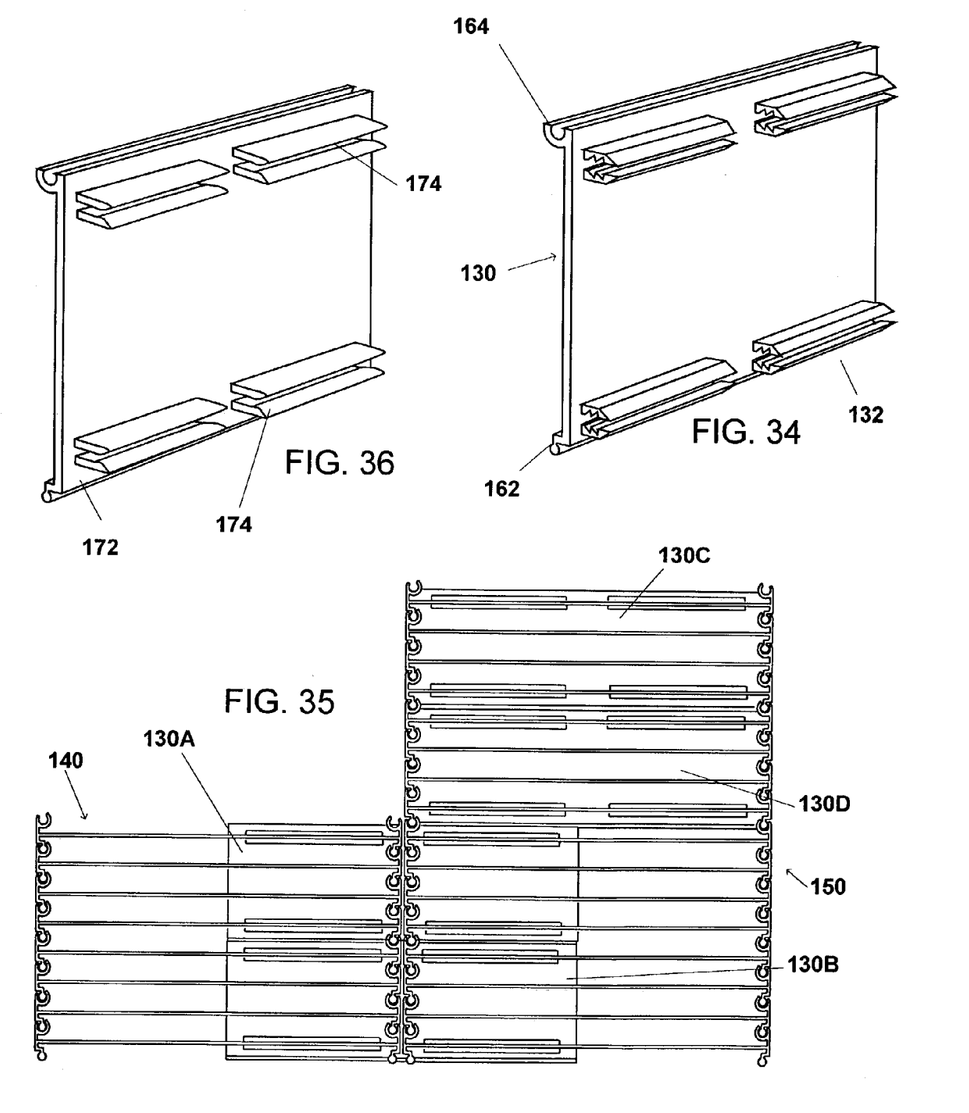
FIG. 34 shows a preferred end piece.
FIG. 35 shows the utilization of a preferred end piece.
FIG. 36 shows another preferred end piece.

While the above description contains many specifications, the reader should not construe these as limitations on the scope of the invention, but merely as exemplifications of preferred embodiments thereof. Those skilled in the art will understand that many other possible variations are within its scope. For example, it is possible to provide die-stamped card stock 26 with adhesive bonding strips. FIG. 32 shows adhesive bonding strips 110 attached to the bottom side of lower portion 43 of die-stamped card stock 26. FIG. 33 shows bonding adhesive strip covers 111 removed by the user from lower portion 43. After bonding adhesive strip 111 has been removed, a sticky bonding adhesive 112 is left attached to lower portion 43. The user can then bond lower portion 43 to upper portion 44 in a manner similar to that described above in reference to FIG. 15. Also, it is possible to fabricate end piece 130 so that it is as shown in FIG. 34. End piece 130 has separated grips 132 so that adjacent stacked disc storage shelves are prevented from moving relative to each other. For example end pieces 130A and 130B prevent the relative movement between eight stacked disc storage shelves 140 and sixteen stacked disc storage shelves 150 (FIG. 35). Also, it should be noted that end piece 130 has elongated male tab 162 and an elongated female receptor 164 to also help prevent relative motion between adjacent stacked disc storage shelves. For example, by reference to FIG. 35, the elongated male tab of end piece 130C has been slid into the elongated female receptor of end piece 130D. The elongated male tab of end piece 130D has been slid into the elongated female receptor of end piece 130A. The elongated male tab of end piece 130A has been slid into the elongated female receptor of end piece 130B. Also, although FIG. 34 and FIG. 24 shows grips 132 and 61 having jagged teeth, it should be noted that the grips can be smooth. For example, FIG. 36 shows a perspective view of end piece 172 with grips 174 having a smooth surface. Grips 174 use friction force to grip the disc support platforms. Also, although the above preferred embodiments disclosed in careful detail how a computer controlled printer is utilized to prints labels on the die-stamped card stock identifying the contents of the CD or DVD, it is possible to print information onto the die-stamped card stock without utilizing either a computer or a computer controlled printer. For example, a user could manually write on the die-stamped card stock the contents of the CD or DVD. Or the user could fold the die-stamped card stock into a disc holder in the manner described above and then manually write the contents of the CD or DVD onto the disc holder. Also, it should be noted that the disc storage shelves, the end pieces and the die-stamped card stock can be made available in a variety of colors. With this option a user can color code categories. For example, all music discs are printed on yellow card stock and stored on yellow disc storage shelves. This will give the user instant recognition of the desired disc. Accordingly the reader is requested to determine the scope of the invention by the appended claims and their legal equivalents, and not by the examples which have been given.

I claim:

1. A kit for storage of computer discs, comprising:
   A. a plurality of stackable disc storage shelves, each shelf comprising two elongated male tab elements and two elongated female receptor elements,
   B. a plurality of die-stamped sheets, each sheet comprising creases for easy folding into a disc holder for holding computer discs, so as to provide a plurality of disc holders,
   wherein a number of said stackable disc storage shelves are fitted together to make an expandable disc storage unit comprising slots for snuggly receiving and for storing computer discs contained inside a plurality of the disc holders, wherein said each of said plurality of sheets comprises a bendable tab for identifying the content of the computer discs, wherein each said bendable tab is visible while the plurality of disc holders are stored inside said expandable disc storage unit, wherein the disc holders each comprise a pocket for holding the computer discs.

2. A kit for storage of computer discs, comprising:
   A. a plurality of stackable disc storage shelves, each shelf comprising two elongated male tab elements and two elongated female receptor elements,
   B. a plurality of die-stamped sheets, each sheet comprising creases for easy folding into a disc holder comprising a pocket for holding computer discs, so as to provide a plurality of disc holders,
   wherein a number of said stackable disc storage shelves are fitted together to make an expandable disc storage unit comprising slots for receiving and for storing computer discs contained inside a plurality of the disc holders, wherein said each of said plurality of sheets comprises a bendable tab for identifying the content of the computer discs, wherein each said bendable tab is visible while the plurality of disc holders are stored inside said expandable disc storage unit.

3. The kit as in claim 2 and further comprising software comprising computer programming instructions for instructing a personal computer to print contents of computer discs onto said die-stamped sheets before the sheets are folded into disc holders.

4. The kit as in claim 3, wherein said programming instructions are recorded onto a compact disc.

5. The kit as in claim 3, wherein said programming instructions are downloaded via a computer network.

6. The kit as in claim 2, wherein said plurality of stackable disc storage shelves are stacked by snapping said two elongated male tab elements into said two elongated female receptor elements.

7. The kit as in claim 2, wherein said plurality of stackable disc storage shelves are stacked by sliding said two elongated male tab elements into said two elongated female receptor elements.

8. The kit as in claim 2, wherein each one of said plurality of die-stamped sheets comprises:
   A. perforations, and
   B. bend creases.

9. The kit as in claim 8, wherein each one of said plurality of die-stamped sheets further comprises at least one bonding adhesive strip.

10. The kit as in claim 2, wherein each one of said plurality of die-stamped sheets is card stock.

11. The kit as in claim 2, wherein each said female receptor element comprises an opening having an opening size, wherein each said male tab element comprises a diameter having a diameter size, wherein said diameter size is greater than said opening size.

12. The kit as in claim 2, wherein said plurality of stackable disc storage shelves is a plurality of extruded stackable disc storage shelves.

13. The kit as in claim 2, wherein said plurality of stackable disc storage shelves and said plurality of die-stamped sheets are color-coded to allow for easier recognition of the computer discs.

14. The kit as in claim 2, further comprising at least one end support piece, wherein when said plurality of stackable disc storage shelves are stacked said at least one end support piece prevents said plurality of stackable disc storage shelves from sliding relative to each other.

15. The kit as in claim 2, wherein each said bendable tab comprises:
A. a front side comprising information identifying the content of the discs, and
B. a back side comprising information identifying the content of the discs.

* * * * *